United States Patent
Sato

[11] Patent Number: 5,811,902
[45] Date of Patent: *Sep. 22, 1998

[54] SUPPORT STRUCTURE FOR ELECTRIC MOTOR USED FOR OPERATING PUMP

[75] Inventor: Takashi Sato, Okazaki, Japan

[73] Assignee: Nippondenso Co., Ltd., Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 538,556

[22] Filed: Oct. 3, 1995

[30] Foreign Application Priority Data

Oct. 3, 1994 [JP] Japan .................................. 6-239018
Aug. 10, 1995 [JP] Japan .................................. 7-204553

[51] Int. Cl.$^6$ .............................. H02K 5/24; F16C 23/02
[52] U.S. Cl. .............................. 310/90; 310/51; 384/192; 384/495; 384/517; 384/626
[58] Field of Search ..................... 310/90, 51; 384/517, 384/518, 192, 450, 495, 500, 519, 611, 602, 620, 626

[56] References Cited

U.S. PATENT DOCUMENTS

| | | | |
|---|---|---|---|
| 4,480,881 | 11/1984 | Fujimori | 310/90 |
| 4,694,212 | 9/1987 | Montagu | 310/90 |
| 4,851,731 | 7/1989 | Saotome et al. | 310/258 |
| 5,109,171 | 4/1992 | Schmider | 310/51 |
| 5,128,574 | 7/1992 | Koizumi et al. | 310/90 |
| 5,174,662 | 12/1992 | Harvey | 384/611 |
| 5,207,514 | 5/1993 | Weissgerber | 384/497 |
| 5,372,433 | 12/1994 | Nakanishi et al. | 384/192 |
| 5,426,988 | 6/1995 | Ohata et al. | 74/55 |

FOREIGN PATENT DOCUMENTS

| | | | |
|---|---|---|---|
| 3338507 | 8/1984 | Germany | 384/517 |
| 3-39361 | 4/1991 | Japan | 310/51 |
| 3-198650 | 8/1991 | Japan | 310/51 |
| 2286921 | 8/1987 | United Kingdom | 384/517 |

OTHER PUBLICATIONS

U.S.S.N. 08/363,518.

*Primary Examiner*—Steven L. Stephan
*Assistant Examiner*—K. Eizo Tamai
*Attorney, Agent, or Firm*—Cushman Darby & Cushman IP Group of Pillsbury Madison & Sutro LLP

[57] ABSTRACT

A motor support apparatus is provided which supports an output shaft of a motor used to operate a pump. The motor support apparatus includes a support housing, a bearing chamber formed in said support housing, a bearing member for bearing an output shaft of a motor. The bearing member is disposed within the bearing chamber with a given clearance between itself and an inner wall of the bearing chamber. A spring is provided so as to produce an eccentric spring load acting on the bearing member so as to decrease the given clearance for retaining the bearing member tightly within the bearing chamber in order to suppress mechanical vibrations generated during a motor operation.

23 Claims, 8 Drawing Sheets

SUPPORT STRUCTURE FOR ELECTRIC MOTOR USED FOR OPERATING PUMP

BACKGROUND OF THE INVENTION

1. Technical Field

The present invention relates generally to an improved support structure for a motor, and more particularly, to a vibration-damping structure for an electric motor used for operating a pump.

2. Background Art

FIG. 13 shows a conventional electric motor for a hydraulic pump employed in an anti-lock brake system (ABS) for automotive vehicles.

In the shown electric motor, when an armature shaft 107 is mounted in a bearing chamber 105 formed in a pump housing 103, a ball bearing 121 tightly secured on the top of the armature shaft 107 is inserted into a bottom portion of the bearing chamber 105, while a ball bearing secured on the base of the armature shaft 107 is fixed at a recessed portion 105b formed in the pump housing 103 using resin material. A disc spring 125 is installed in the bottom portion of the bearing chamber 105 so as to provide a constant degree of thrust force to the ball bearing 121 for enhancing the support of the top of the armature shaft 107.

In the above structure, a small clearance is formed between an inner wall of the bearing chamber 105 and a peripheral surface of the ball bearing 121 for facilitating easy insertion of the ball bearing. This, however, causes vibrations to be generated during operation. In order to suppress such vibrations, it is necessary to decrease the clearance as much as possible. This, however, requires a high degree of machining accuracy, resulting in increase in total cost of the system.

SUMMARY OF THE INVENTION

It is therefore a principal object of the present invention to avoid the disadvantages of the prior art.

It is another object of the present invention to provide an improved vibration-damping structure of an electric motor for a pump.

According to one aspect of the present invention, there is provided a motor support apparatus which comprises a support housing, a bearing chamber formed in the support housing, a bearing member for bearing an output shaft of a motor, the bearing member being disposed within the bearing chamber with a given clearance between the bearing member and an inner wall of the bearing chamber, and a biasing force providing means for providing a biasing force to the bearing member so as to decrease the given clearance between the bearing member and the inner wall of the bearing chamber to retain the bearing member within the bearing chamber.

In the preferred mode of the invention, the bearing member has an outer peripheral surface facing the inner wall of the bearing chamber with the given clearance. The biasing force is provided to incline the bearing member so as to bring the outer peripheral surface of the bearing member into engagement with the inner wall of the bearing chamber.

The biasing force providing means includes a plurality of spring portions which press an end surface of the bearing member in an axial direction of the output shaft of the motor. One of the spring portions is designed to produce a spring force greater than that of the other of the spring portions.

The spring portions are arranged apart from each other at given regular intervals.

Each of the spring portions is formed with a portion of a single metallic plate which is cut out and bent at a given angle.

A recessed portion is formed in the end surface of the bearing member in which a top portion of one of the spring portions is received so as to produce a smaller spring force than that of the other of the spring portions.

According to another aspect of the invention, there is provided a motor-operated pump apparatus which comprises a pump housing, a pump portion disposed in the pump housing for pumping fluid, a motor having an output shaft which includes a pump-operating portion and an armature core, a bearing chamber formed in the pump housing, first and second bearing members disposed within the bearing chamber for rotatably bearing the output shaft of the motor across the pump-operating portion, at least one of the first and second bearings being arranged with a given clearance between itself and inner wall of the bearing chamber, and a biasing force providing means for providing a biasing force to at least one of the first and second bearing members to decrease the given clearance for retaining the at least one of the first and second bearing members within the bearing chamber.

In the preferred mode of the invention, the at least one of the first and second bearing members has an outer peripheral surface facing the inner wall of the bearing chamber with the given clearance. The biasing force is provided to incline the at least one of the first and second bearing members so as to bring the outer peripheral surface into engagement with the inner wall of the bearing chamber.

The biasing force providing means includes a plurality of spring portions producing spring forces pressing an end surface of the at least one of the first and second bearing members in an axial direction of the output shaft of the motor. One of the spring portions is designed to produce the spring force greater than that of the other of the spring portions.

The spring portions are arranged apart from each other at given regular intervals.

A recessed portion is formed in the end surface of the at least one of the first and second bearing members in which a top portion of one of the spring portions is received so as to produce a smaller spring force than that of the other of the spring portions.

The first bearing member includes a ball bearing disposed between the pump-operating portion and the armature core of the motor, having an inner ring secured on the output shaft of the motor and an outer ring secured on the inner wall of the bearing chamber. The biasing force providing means produces the biasing force acting on the second bearing member in a direction to the pump-operating portion.

A third bearing member, a second bearing chamber, and a pressing means are further provided. The third bearing member bears an end of the output shaft of the motor opposite an end on which the first and second bearing members are secured. The second bearing chamber stores therein the third bearing member. The pressing means presses the third bearing member in an axial direction of the output shaft so as to incline the third bearing member into engagement with an outer peripheral surface of the output shaft and an inner wall of the second bearing chamber.

The biasing force provided by the biasing force providing means acting on the second bearing member is greater than an pressing force provided by the pressing means acting on the third bearing member.

The biasing force providing means and the pressing means are both formed with plate springs.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
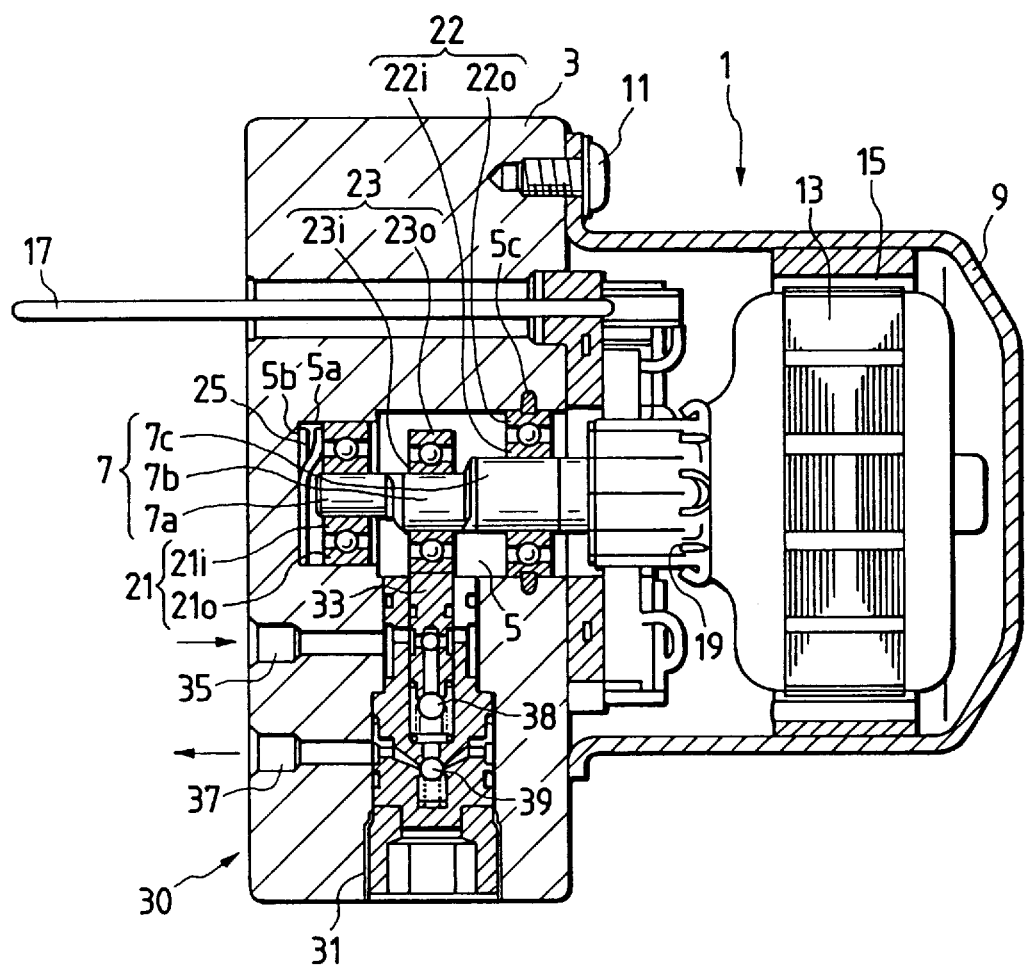
FIG. 1 is a cross sectional view which shows a motor support structure according to the present invention.

Referring now to the drawings, particularly to FIG. 1, there is shown an electric motor 1 for a hydraulic pump which may be used in an anti-lock brake system (ABS) for automotive vehicles.

The electric motor 1 is, as shown in the drawing, mounted on a pump housing 3. An armature shaft 7 is inserted into a bearing chamber 5 formed in the pump housing 3, while a motor housing (stator) 9 is secured on an outer wall of the pump housing 3 using screws 11 (only one is shown). An armature 13 is supported within the motor housing 9 by first and second ball bearings 21 and 22 at two support points in a cantilever fashion so that it may be placed in the center of a permanent magnet 15.

The first ball bearing 21 is mounted on the armature shaft 7 by securing an inner ring 21i on the top portion 7a of the armature shaft 7 with interference fit. The first ball bearing 21 also has an outer ring 21o inserted into the bearing chamber 5 with a given degree of a clearance between itself and an inner wall 5a at the bottom of the bearing chamber 5. On the bottom 5b of the bearing chamber 5, a plate spring 25 is installed so as to provide an eccentric load to the outer ring 21o of the first ball bearing 21 to thrust it toward the armature 13.

Figure 2A:
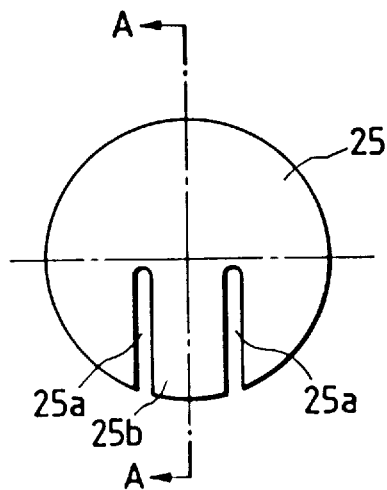
FIG. 2(a) is a plan view which shows a plate spring providing an eccentric load to a bearing.
Figure 2B:
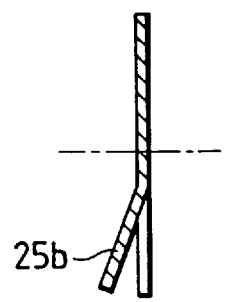
FIG. 2(b) is a cross sectional view taken along the line A—A in FIG. 2(a)
Figure 3A:
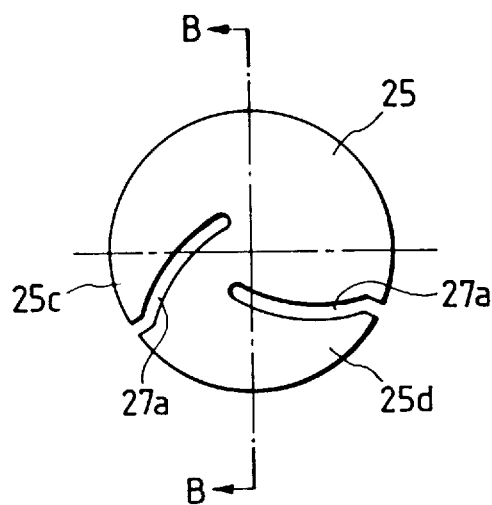
FIG. 3(a) is a plan view which shows a plate spring providing an eccentric load to a bearing.
Figure 3B:
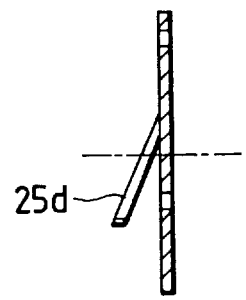
FIG. 3(b) is a cross sectional view taken along the line B—B in FIG. 3(a)

The plate spring 25 is, as shown in FIGS. 2(a) and 2(b), made of a steel disc which has formed therein two grooves 25a extending parallel to each other to form a rectangular portion which is bent at a given angle to define a spring portion 25b. The plate spring 25 may alternatively have formed therein two curved grooves 27a, as shown in FIGS. 3(a) and 3(b), which extend spirally to form crescent-shaped portions 25c and 25d. The crescent-shaped portion 25d is, similar to the one shown in FIGS. 2(a) and 2(b), bent at a given angle to define a spring portion.

Figure 4:
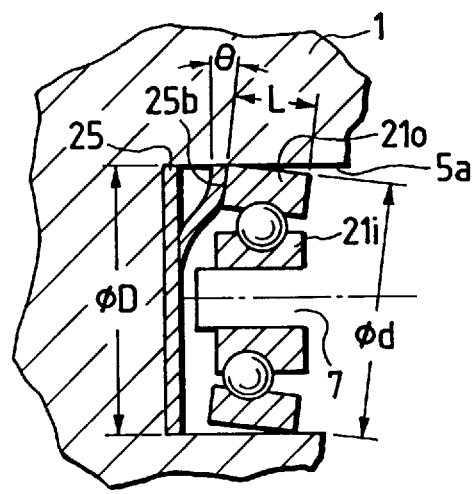
FIG. 4 is a cross sectional view which shows a bearing inclined by an eccentric load provided by a plate spring.

The plate spring 25, as shown in FIG. 4, is so constructed as to provide an eccentric force acting on a peripheral portion of the first ball bearing 21 (i.e., the outer ring 21o) in an axial direction of the armature shaft 7 to bring the outer ring 21o into constant engagement with the inner wall 5a of the bearing chamber 5. Specifically, the plate spring 25 is so designed as to satisfy the following relation:

$$L \cdot \sin\theta > (\phi D - \phi d)/2$$

where $\theta$ is, as shown in FIG. 4, an allowable clearance angle of the bearing, L is an axial length (i.e., the thickness) of the bearing, $\phi D$ is an inner diameter of the bearing, and $\phi d$ is an outer diameter of the bearing.

The second ball bearing 22 is secured tightly on the armature shaft 7 by press-fitting an inner ring 22i on a large-diameter base (armature core) 7c, and also secured on a recessed portion 5c formed in an entrance portion of the bearing chamber 5 using resin material.

The armature shaft 7 has at its central portion an eccentric shaft 7b serving as a cam for driving the pump 30. On the eccentric shaft 7b, a third ball bearing 23 is mounted with interference fit.

The pump 30 includes a piston 33 which is supported within the pump housing 3 through a screw 31. The piston 33 is oriented perpendicular to the armature shaft 7, and serves as a cam follower engaging an outer ring 23o of the third ball bearing 23.

The motor 1 is activated by the power supplied from a terminal 17 to a commutator 19 through a brush to energize the armature 13 for rotating the armature shaft 7. The rotation of the armature shaft 7 causes the piston to be displaced vertically through the third ball bearing 23 secured on the eccentric shaft 7b, so that fluid (oil) is sucked through an inlet 35 in synchronism with the linear displacement of the piston 33, and then discharged from an outlet 37. For avoiding backflow, an inlet check valve 38 and an outlet check valve 39 are provided in the pump 30.

Figure 13:
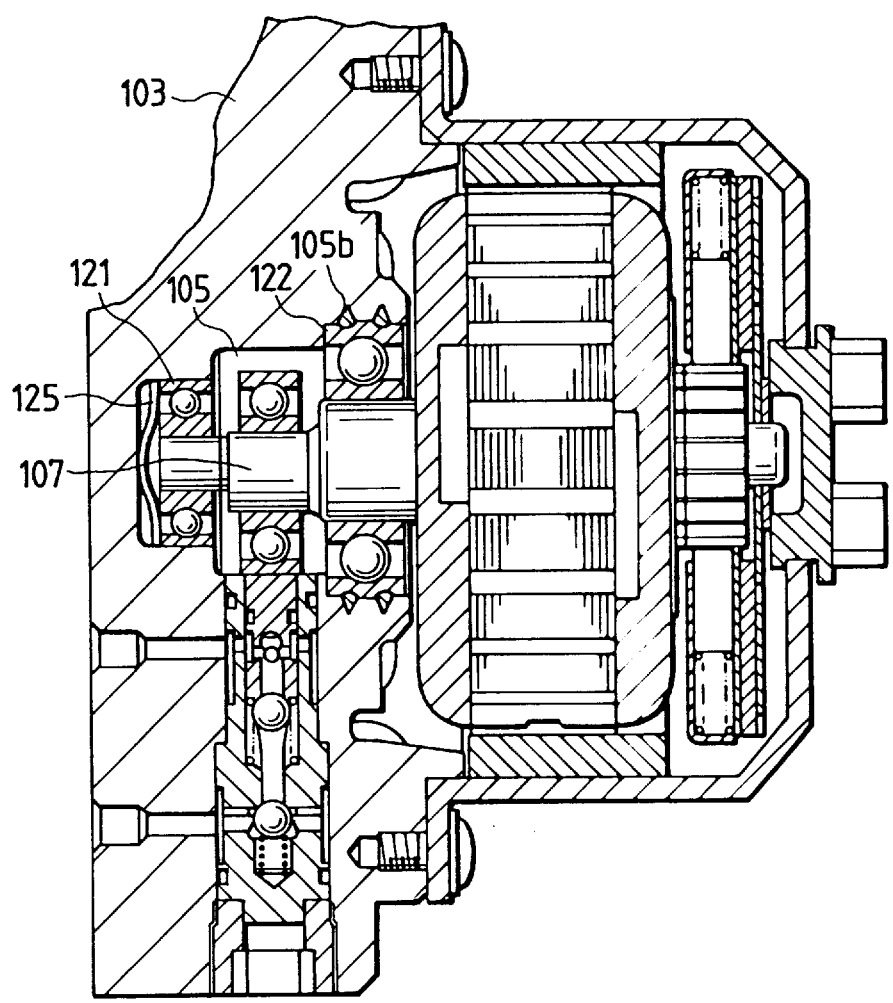
FIG. 13 is a cross sectional view which shows a conventional motor support structure.

During a fluid-discharging operation of the pump 30, or a period of time until the armature 7 stops rotating after completion of the fluid-discharging operation, the pump housing 3 vibrates undesirably. These vibrations are, however, well damped since both outer rings 21o and 22o of the first and second ball bearings 21 and 22 are in constant engagement with the pump housing 3. Particularly, the outer ring 21o of the first ball bearing 21 is, as discussed above, urged by an eccentric load produced by the plate spring 25 into constant engagement with the inner wall 5a of the bearing chamber 5, so that the vibrations are suppressed greatly as compared with the conventional structure shown in FIG. 13.

Figure 5:
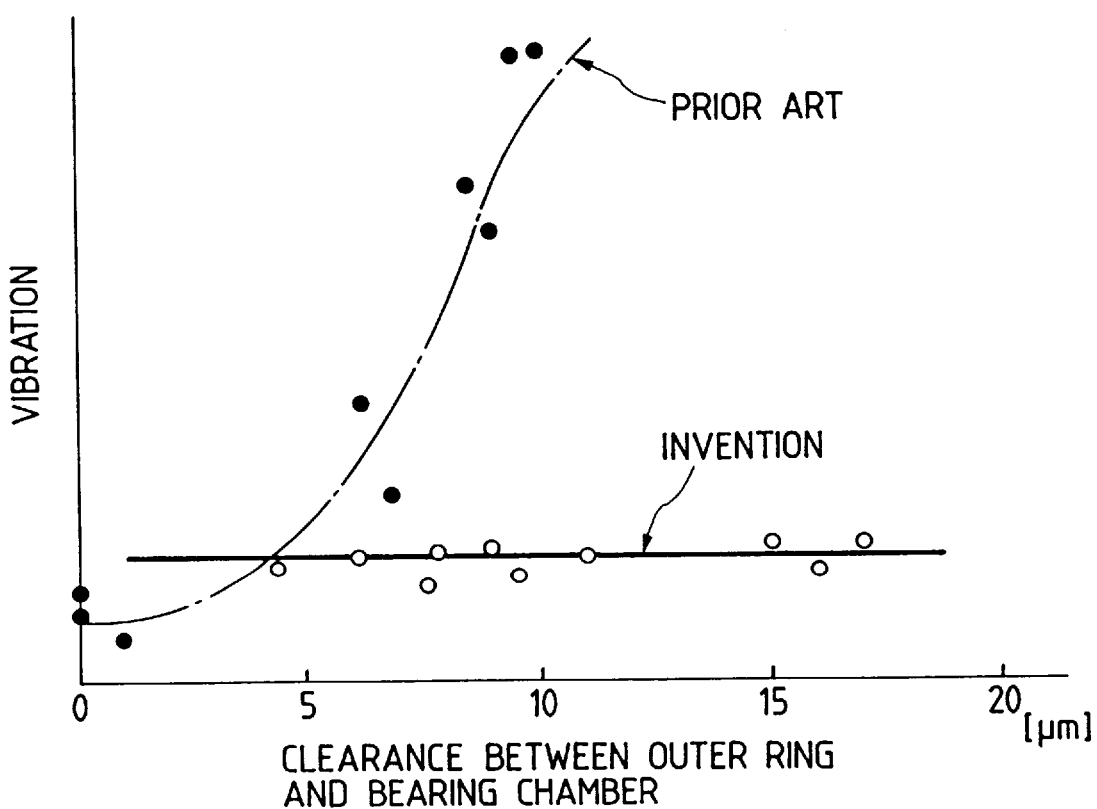
FIG. 5 is a graph which shows the relation between the degree of vibration and a clearance between an outer ring of a bearing and an inner wall of a bearing chamber.

FIG. 5 shows the relation between the degree of vibration and a clearance between the outer peripheral surface of the outer ring 21o of the first ball bearing 21 and the inner wall 5a of the bearing chamber 5. Black circles represent experimental results using the conventional motor support structure in FIG. 13, while white circles represent experimental results using the motor support structure of the present invention.

FIG. 5 shows that the motor support structure of the invention suppresses the vibrations at lower level even if the clearance is increased since the outer ring 21o of the first ball bearing 21 constantly engages the inner wall 5a of the bearing chamber 5, while, in the conventional motor support structure, the vibrations are increased above those of the motor support structure of the invention when the clearance exceeds about 5 μm. It will thus be appreciated that the motor support structure of the invention is effective to damp the vibrations even when a greater clearance than that in the conventional motor support structure exists.

Therefore, the motor support structure of the invention allows the bearing chamber 5 to be formed in the pump housing 3 with lower machining accuracy, thus resulting in decrease in manufacturing cost. Additionally, even if there are variations in machining accuracy, the motor support structure of the invention produces a constant level of the vibration-damping effect.

While in the above embodiment, the eccentric load is applied on the outer ring 21o of the first ball bearing 21 to be urged into constant engagement with the inner wall 5a of the bearing chamber 5, even if the eccentric load is lowered to the extent that a small clearance is formed between the outer ring 21o and the inner wall 5a, substantially the same vibration-damping effect is obtained. This is because the vibrations are decreased as the clearance becomes small.

Figure 6:
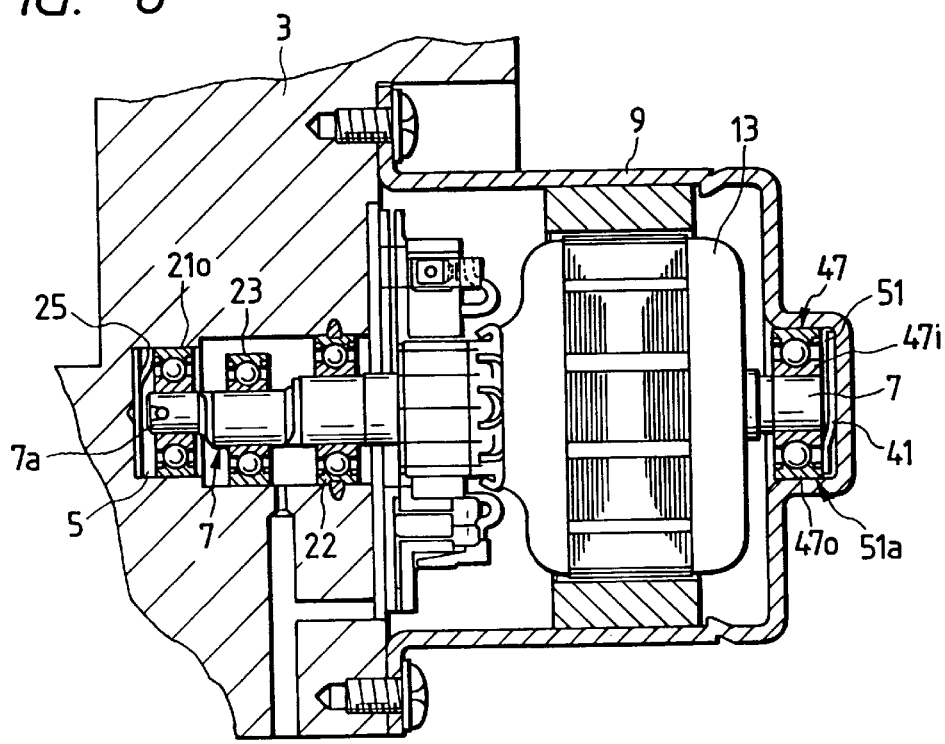
FIG. 6 is a cross sectional view which shows a motor support structure according to the second embodiment of the invention.
Figure 7:
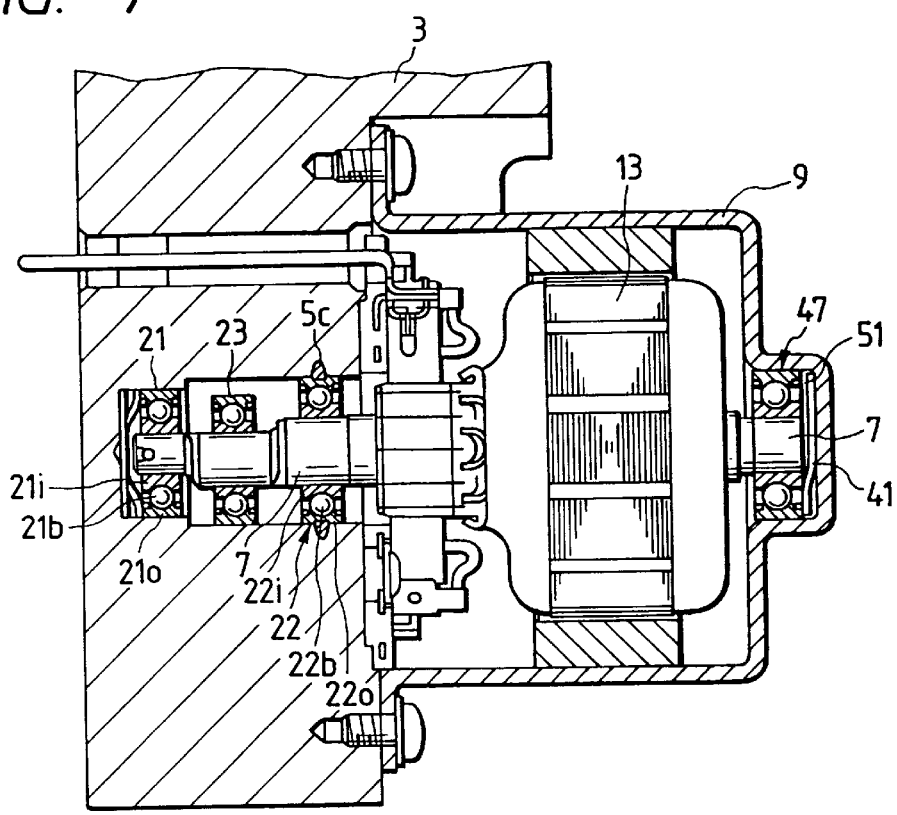
FIG. 7 is a cross sectional view which shows a motor support structure according to the third embodiment of the invention.

FIG. 6 shows a second embodiment of the motor support structure. The same reference numbers represent the same parts as shown in FIG. 1, and explanation thereof in detail will be omitted here.

The second embodiment, as clearly shown in the drawing, includes a fourth ball bearing 47 having an inner ring 47i secured on the other end of the armature shaft 7 with interference fit. The fourth ball bearing 47 is disposed within a bearing housing 51 formed in the motor housing 9, and urged at an axial end surface of an outer ring 47o by a plate spring 41 similar to the plate spring 25 in a direction to the armature 13, thereby bringing a peripheral surface of the outer ring 47o into constant engagement with an inner wall 51a of the bearing housing 51.

With the above arrangements, the armature shaft 7 is supported at both ends by the first ball bearing 21 and the fourth ball bearing 47, and a portion thereof between the eccentric shaft 7b and the armature 13 is supported by the second ball bearing 22, so that misalignment of the center of the armature shaft 7 is eliminated. Additionally, the plate springs 25 and 41 eliminate the clearances. Therefore, the vibrations of the pump housing 3 are damped further.

FIGS. 7 to 9(a) and 9(b) show a third embodiment of the motor support structure. The same reference numbers as employed in FIG. 1 represent the same parts, and explanation thereof in detail will be omitted here.

Figure 8A:
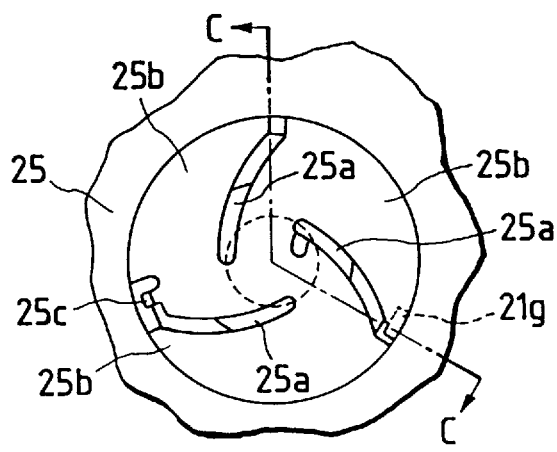
FIG. 8(a) is a view which shows a spring plate according to the third embodiment.
Figure 8B:
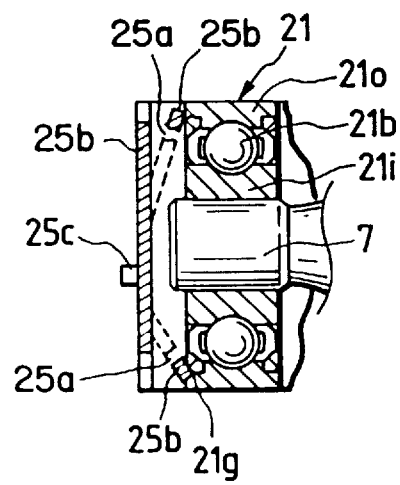
FIG. 8(b) is a cross sectional view taken along the line C—C in FIG. 8(a)

The third embodiment is different from the above second embodiment only in shape of the plate springs 25 and 41. The plate spring 25, as shown in FIGS. 8(a) and 8(b), includes a disc having formed therein three slits 25a curved spirally to define three crescent-shaped spring projections 25b having substantially the same size. The crescent-shaped spring projections 25b are all bent at the same angle in a direction perpendicular to the surface of the disc to provide the same level of spring loads. The plate spring 25 also has formed in a portion of the periphery a claw or projection 25c bent at a given angle in a direction opposite the crescent-shaped spring projections 25b. The projection 25c engages a recessed portion (not shown) formed in the bottom 5b of the bearing chamber 5 to prevent the plate spring 25 from rotating undesirably.

The first ball bearing 21, as shown in FIG. 8(b), has formed in peripheral end surface a recess or groove 21g into which the top of one of the crescent-shaped spring projections 25b of the plate spring 25 is fitted. Thus, when the plate spring 25 is disposed between the first ball bearing 21 and the bottom of the bearing chamber 5 under a given pressure, the degree of deformation of the one of the projections 25b engaging the groove 21g becomes smaller than those of the other two projections, so that an eccentric force is provided to the first ball bearing 21.

Figure 9A:
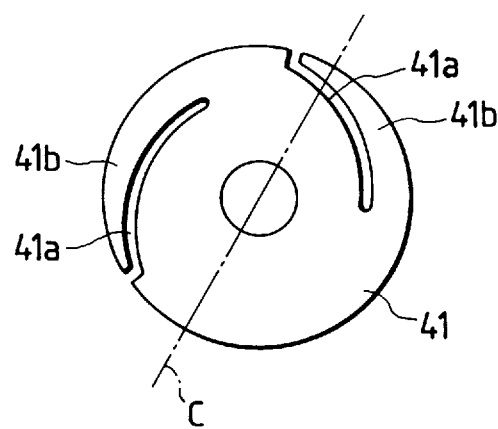
FIGS. 9(a) and 9(b) are views which show a second plate spring according to the third embodiment.
Figure 9B:
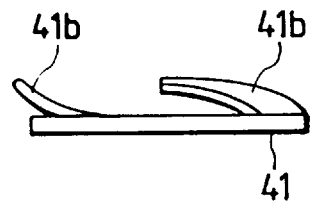

The plate spring 41, as shown in FIGS. 9(a) and 9(b), includes a disc having formed therein two slits 41a curved spirally and extending asymmetrically to define crescent-shaped spring projections 41b which are bent at a given angle. The tops of the projections 41b, as clearly shown in FIG. 9(a), lie on one side from the center line C to produce an eccentric force. Additionally, the width of the projections 41b is smaller than that of the projections 25b of the plate spring 25, so that a spring force is small.

In the third embodiment, the spring coefficient of the three projections 25b of the plate spring 25 is about four times greater than that of the projections 41b of the plate spring 41.

With the above arrangements, the three projections 25b of the plate spring 25 press an end surface of the outer ring 21o of the first ball bearing 21 to produce the eccentric force, as explained above, to incline the outer ring 21o with respect to an axial direction thereof so that the clearance between the outer ring 21o and the inner wall 5a of the bearing chamber 5 is eliminated. The eccentric force is also transmitted to the armature shaft 7 through balls 21b and the inner ring 21i to produce a thrust force acting on the inner ring 22i of the second ball bearing 22 in the right direction because the spring force of the plate spring 41 is, as mentioned above, smaller than that of the plate spring 25. The thrust force then acts on the outer ring 22o through balls 22b, so that the rigidity of supporting the armature shaft 7 is increased with the aide of elasticity of the resin material 5c. The first ball bearing 21 is, as mentioned above, pressed by the three projections 25b of the plate spring 25, so that the thrust force acts on the second ball bearing 22 uniformly in a circumferential direction.

Figure 10:
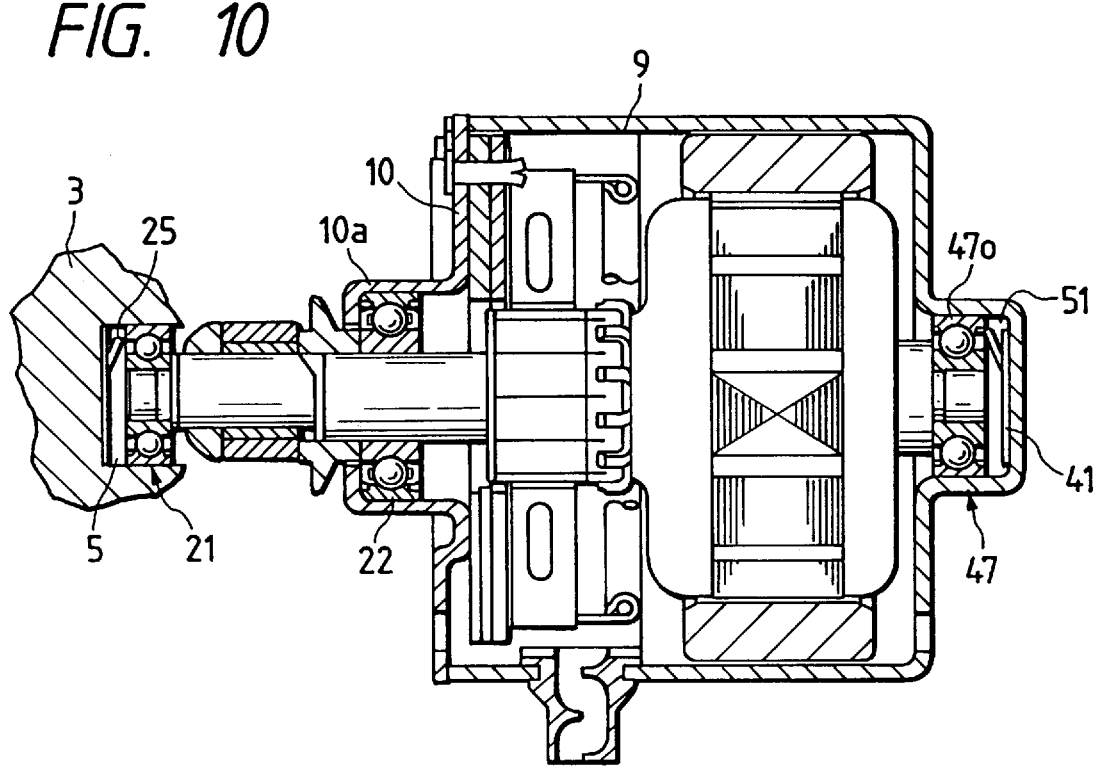
FIG. 10 is a cross sectional view which shows a motor support structure according to the fourth embodiment of the invention.

FIG. 10 shows a fourth embodiment of the motor support structure which is a modification of the second embodiment shown in FIG. 6. The same reference numbers as employed in the second embodiment represent the same parts, and explanation thereof in detail will be omitted here.

In the fourth embodiment, the second ball bearing 22 is disposed within a bearing housing 10a formed in an end plate 10 attached to the motor housing 9. The first ball bearing 21 is, similar to the above embodiments, disposed within the bearing chamber 5 of the pump housing 3. The plate springs 25 and 41, as clearly shown in the drawing, have the projections 25b oriented in the same direction (i.e., upper direction).

Figure 11A:
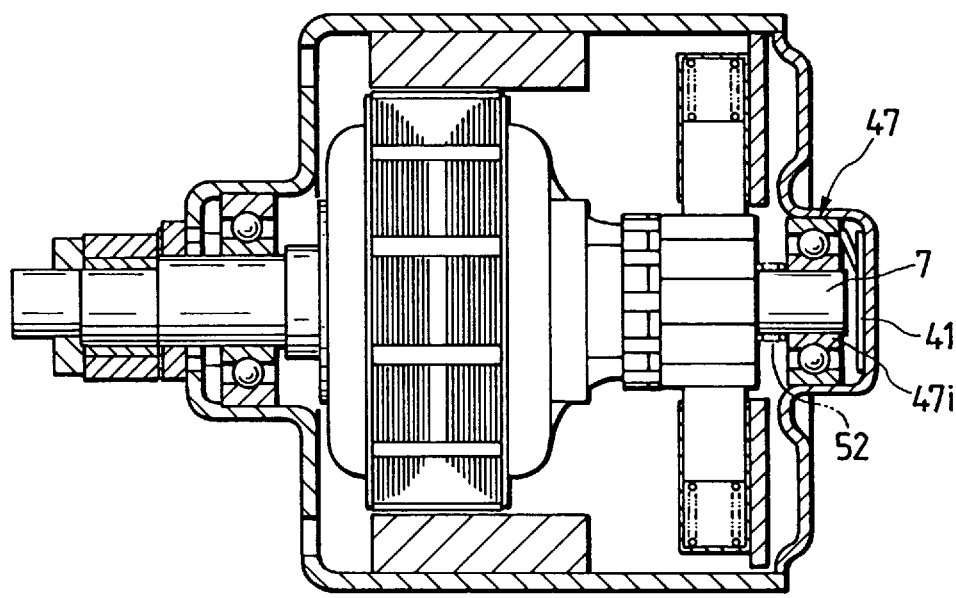
FIG. 11(a) is a cross sectional view which shows a motor support structure according to the fifth embodiment of the invention.
Figure 11B:
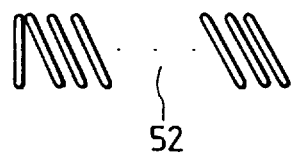
FIG. 11(b) is a view which shows a coil spring used in the motor support structure shown in FIG. 11(a)

FIGS. 11(a) and 11(b) shows a fifth embodiment of the motor support structure which is a modification of the fourth embodiment.

In the fifth embodiment, a coil spring 52 is disposed around the end of the armature shaft 7 which is designed to provide an eccentric spring load to the inner ring 47i of the fourth ball bearing 47 so that the inner ring 47i engages an outer peripheral surface of the armature shaft 7 to retain the fourth ball bearing 47 tightly on the armature shaft 7. The coil spring 52 is, as shown in FIG. 11(b), designed to have one end biased against an end surface of the inner ring 47i so as to provide the eccentric spring load to the inner ring 47i. Only the coil spring 52 may alternatively be used without use of the spring plate 41. Additionally, the coil spring 52 may also be used instead of the plate springs 25 and 47 as producing eccentric spring loads acting on the outer rings 21o and 47o of the first and fourth ball bearings 21 and 47.

Figure 12:
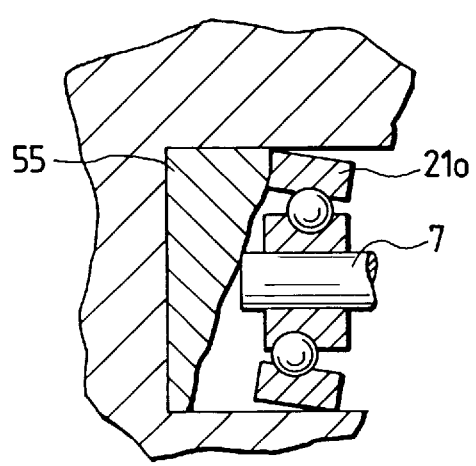
FIG. 12 is a cross sectional view which shows an eccentric force providing block which may be used in place of a plate spring.

Further, resin-made or metallic block 55, as shown in FIG. 12, may be used instead of the plate spring 25 (or 41) which is geometrically oriented to provide an eccentric load to the outer ring 21o of the first bearing 21.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, oil-retaining self-aligning bearings may be used in place of the ball bearings, as discussed above. The present invention may be used with another type of motor wherein a stator consists of a coil and a rotor consists of an iron core.

What is claimed is:

1. A motor support apparatus comprising:

storage portion;

a bearing assembly disposed within said storage portion, bearing an output shaft of a motor, said bearing assembly including a first member disposed in engagement with said storage portion, a second member secured on said output shaft of the motor, and a third member allowing relative rotation of said first and said second members;

pressure means for providing a pressure load to said first member substantially parallel to said output shaft of the motor to incline said first member, said pressure means including a plurality of spring portions which press an end surface of said first member in an axial direction of said output shaft of said motor; and a recessed portion formed in an end surface of said first member in which a top portion of one of said spring portions is received so as to produce a smaller spring force than that of others of said spring portions.

2. A motor support apparatus as set forth in claim 1, wherein said spring portions are arranged apart from each other at given regular intervals.

3. A motor support apparatus comprising:

a storage portion;

a bearing assembly disposed within said storage portion, bearing an output shaft of a motor, said bearing assembly including a first member disposed in engagement with said storage portion, a second member secured on said output shaft of said motor, and a third member allowing relative rotation of said first and said second members;

pressure means disposed within said storage portion in an axial direction of said output shaft of said motor to provide a pressure load to said first member to incline said first member, said pressure means including a plurality of spring portions which press an end surface of said first member in an axial direction of said output shaft of said motor; and a recessed portion formed in an end surface of said first member in which a top portion of one of the spring portions is received so as to produce a smaller spring force than that of others of said spring portions.

4. A motor support apparatus as set forth in claim 3, wherein said spring portions are arranged apart from each other at given regular intervals.

5. A motor support apparatus comprising:

a support housing;

a bearing chamber formed in said support housing;

a bearing member for bearing an output shaft of a motor, said bearing member being disposed within said bearing chamber with a given clearance between said bearing member and an inner wall of said bearing chamber, said bearing member having an outer peripheral surface facing said inner wall of said bearing chamber with said given clearance; and biasing force providing means for providing a biasing force to said bearing member so as to decrease said given clearance between said bearing member and the inner wall of said bearing chamber to retain said bearing member within said bearing chamber, said biasing force providing means including a plurality of spring portions arranged apart from each other, the plurality of spring portions pressing an end surface of said bearing member in an axial direction of said output shaft of said motor, one of said spring portions being designed to produce a spring force greater than that of others of said spring portions; and a recessed portion formed in said end surface of said bearing member in which a top portion of one of said spring portions is received so as to produce a smaller spring force than that of said others of said spring portions, wherein said biasing force providing means is provided to incline said bearing member so as to bring said outer peripheral surface of said bearing member into engagement with said inner wall of said bearing chamber.

6. A motor support apparatus as set forth in claim 5, wherein the spring portions are arranged apart from each other at given regular intervals.

7. A motor support apparatus as set forth in claim 5, each of the spring portions is formed with a portion of a single metal plate which is cut out and bent at a given angle.

8. A motor-operated pump apparatus comprising:

a pump housing;

a pump portion disposed in said pump housing for pumping fluid;

a motor having an output shaft which includes a pump-operating portion and an armature core;

a bearing chamber formed in said pump housing;

first and second bearing members disposed within said bearing chamber for rotatably bearing said output shaft of said motor across said pump-operating portion, at least one of said first and said second bearings being arranged with a given clearance between itself and an inner wall of said bearing chamber, said first bearing member having an outer peripheral surface facing said inner wall of said bearing chamber with said given clearance;

biasing force providing means for providing a biasing force to at least one of said first and said second bearing members to decrease said given clearance for retaining said at least one of said first and said second bearing members within said bearing chamber, said biasing force providing means including a plurality of spring portions arranged apart from each other, the plurality of spring portions producing spring forces pressing an end surface of said at least one of said first and said second bearing members in an axial direction of said output shaft of said motor, one of said spring portions being designed to produce said spring force greater than that of said other spring portions; and a recessed portion formed in said end surface of said at least one of said first and said second bearing members in which a top portion of one of said spring portions is received so as to produce a smaller spring force than that of said other spring portions, wherein said biasing force providing means is provided to incline said first bearing member so as to bring said outer peripheral surface of said first bearing member into engagement with said inner wall of said bearing chamber.

9. A motor-operated pump apparatus as set forth in claim 8, wherein the spring portions are arranged apart from each other at given regular intervals.

10. A motor support apparatus as set forth in claim 8, each of the spring portions is formed with a portion of a single metal plate which is cut out and bent at a given angle.

11. A motor support apparatus comprising:

a support housing;

a bearing chamber formed in said support housing;

a bearing member for bearing an output shaft of a motor, said bearing member being disposed within said bearing chamber with a given clearance between said bearing member and an inner wall of said bearing chamber, said bearing member having an outer peripheral surface facing the inner wall of said bearing chamber with the given clearance; and biasing force providing means for providing a biasing force to said bearing member so as to decrease the given clearance between said bearing member and the inner wall of said bearing chamber to retain said bearing member within said bearing chamber, and the biasing force is provided to incline said bearing member so as to bring the outer peripheral surface of said bearing member into engagement with the inner wall of said bearing chamber, said biasing force providing means including a plurality of spring portions arranged apart from each other at given regular intervals, the plurality of spring portions pressing an end surface of said bearing member in an axial direction of the output shaft of the motor, one of the spring portions being designed to produce a spring force greater than that of the other of the spring portions; and a recessed portion formed in the end surface of said bearing member in which a top portion of one of the spring portions is received so as to produce a smaller spring force than that of the other spring portions.

12. A motor support apparatus as set forth in claim 11, wherein each of the spring portions is formed with a portion of a single metallic plate which is cut out and bent at a given angle.

13. A motor-operated pump apparatus comprising:

a pump housing;

a pump portion disposed in said pump housing for pumping fluid;

a motor having an output shaft which includes a pump-operating portion and an armature core;

a bearing chamber formed in said pump housing;

first and second bearing members disposed within said bearing chamber for rotatably bearing the output shaft of said motor across the pump-operating portion, at least one of said first and second bearings being arranged with a given clearance between itself and an inner wall of said bearing chamber;

biasing force providing means for providing a biasing force to at least one of the first and second bearing members to decrease the given clearance for retaining the at least one of said first and second bearing members within said bearing chamber, and the biasing force is provided to incline said at least one of said first and second bearing members so as to bring the outer peripheral surface into engagement with the inner wall of said bearing chamber; said biasing force providing means including a plurality of spring portions arranged apart from each other at given regular intervals, the plurality of spring portions producing spring forces pressing an end surface of said at least one of said first and second bearing members in an axial direction of the output shaft of the motor, one of the spring portions being designed to produce the spring force greater than that of the other spring portions; and a recessed portion formed in the end surface of said at least one of said first and second bearing members in which a top portion of one of the spring portions is received so as to produce a smaller spring force than that of the other spring portions, wherein said at least one of said first and second bearing members has an outer peripheral surface facing the inner wall of said bearing chamber with the given clearance.

14. A motor-operated pump apparatus as set forth in claim 13, wherein the first bearing member includes a ball bearing disposed between the pump-operating portion and the armature core of said motor, having an inner ring secured on the output shaft of said motor and an outer ring secured on the inner wall of said bearing chamber, and wherein said biasing force providing means produces the biasing force acting on said second bearing member in a direction to the pump-operating portion.

15. A motor-operated pump apparatus as set forth in claim 14, wherein said biasing force providing means includes a plurality of spring portions pressing an end surface of said second bearing member in an axial direction of the output shaft of the motor, one of the spring portions being designed to produce a spring force pressing the end surface of said second bearing member which is greater than that of the other of the spring portions.

16. A motor-operated pump apparatus as set forth in claim 13, further comprising a third bearing member bearing an end of the output shaft of said motor opposite an end on which the first and second bearing members are secured, a second bearing chamber for storing therein said third bearing member, and pressing means for pressing said third bearing member in an axial direction of the output shaft so as to incline said third bearing member into engagement with an outer peripheral surface of the output shaft and an inner wall of said second bearing chamber.

17. A motor-operated pump apparatus as set forth in claim 15, further comprising a third bearing member bearing an end of the output shaft of said motor opposite an end on which the first and second bearing members are secured, a second bearing chamber for storing therein said third bearing member, and pressing means for pressing said third bearing member in an axial direction of the output shaft so as to incline said third bearing member into engagement with an outer peripheral surface of the output shaft and an inner wall of said second bearing chamber.

18. A motor-operated pump apparatus as set forth in claim 17, wherein the biasing force provided by said biasing force providing means acting on said second bearing member is greater than an pressing force provided by said pressing means acting on said third bearing member.

19. A motor-operated pump apparatus as set forth in claim 18, wherein said biasing force providing means and said pressing means are both formed with plate springs.

20. A motor support apparatus comprising:

a storage portion;

a ball bearing assembly disposed within said storage portion, bearing an output shaft of a motor, said ball bearing assembly including an outer member, an inner member, and balls, said outer member being disposed in engagement with said storage portion, having a circular inner surface in which a groove is formed, said inner member secured to said output shaft of said motor, having a circular outer surface in which a groove is formed, said balls being disposed between said grooves of said outer and said inner members so as to allow relative rotation of said outer and said inner members;

an elastic member providing elastic force to said outer member of said ball bearing assembly in a direction substantially parallel to said output shaft of said motor to eliminate play between said outer member and said balls and between said inner member and said balls, said elastic member also inclining only said outer member relative to said output shaft of said motor to eliminate a clearance between said outer member and said storage member, said elastic force acting on said outer member eccentrically so as to have distribution which is asymmetrical with respect to said output shaft of said motor, said elastic member including a plurality of spring portions which press an end surface of said outer member in an axial direction of said output shaft of said motor; and a recessed portion formed in an end surface of said outer member of said ball bearing assembly in which a top portion of one of said spring portions is received so as to produce a smaller spring force than that of others of said other spring portions.

21. A motor support apparatus as set forth in claim 20, wherein said elastic member serves to incline said outer member of said ball bearing assembly so as to bring an outer peripheral surface of said outer member into engagement with an inner wall of said storage portion.

22. A motor support apparatus as set forth in claim 20, wherein said spring portions are arranged apart from each other at given regular intervals.

23. A motor support apparatus as set forth in claim 20, wherein each of said spring portions is formed with a portion of a single metallic plate which is cut out and bent at a given angle.

* * * * *